(12) United States Patent
Wascheul et al.

(10) Patent No.: US 9,279,494 B2
(45) Date of Patent: Mar. 8, 2016

(54) DEVICE FOR TRANSLATABLY CONTROLLING THE MOVEMENT OF A GEAR CHANGE FORK FOR A MOTOR VEHICLE GEARBOX

(75) Inventors: Michael Wascheul, Acheres (FR); Marc Giannoni, Paris (FR)

(73) Assignee: TECHNOBOOST, Paris (FR)

( * ) Notice: Subject to any disclaimer, the term of this patent is extended or adjusted under 35 U.S.C. 154(b) by 266 days.

(21) Appl. No.: 14/115,720

(22) PCT Filed: May 9, 2012

(86) PCT No.: PCT/FR2012/051027
§ 371 (c)(1),
(2), (4) Date: Nov. 5, 2013

(87) PCT Pub. No.: WO2012/160287
PCT Pub. Date: Nov. 29, 2012

(65) Prior Publication Data
US 2014/0076086 A1    Mar. 20, 2014

(30) Foreign Application Priority Data

May 25, 2011   (FR) ..................... 11 54557

(51) Int. Cl.
*F15B 15/00* (2006.01)
*F15B 15/14* (2006.01)
(Continued)

(52) U.S. Cl.
CPC ........ *F16H 61/0021* (2013.01); *F16H 63/3023* (2013.01); *F16H 63/32* (2013.01);
(Continued)

(58) Field of Classification Search
CPC ............ F15B 7/0011; F15B 7/06; F15B 9/10; F15B 15/00; F15B 15/14; F15B 2215/00; F15B 2215/30; F15B 15/1433; F16H 61/0021; F16H 63/32; F16H 63/38; F16H 63/3023; F16H 2063/3079; F16H 2063/321; F16H 63/04; F16H 63/08; F16H 63/30; F16H 3/08

USPC ......... 74/473.11, 335, 325, 346; 285/32, 298, 285/302
See application file for complete search history.

(56) References Cited

U.S. PATENT DOCUMENTS

| 4,003,297 A | 1/1977 | Mott |
| 4,076,465 A * | 2/1978 | Pauliukonis .......... F01B 11/007 417/339 |

(Continued)

FOREIGN PATENT DOCUMENTS

| DE | 102008004497 A1 | 7/2009 |
| DE | 102008063601 A1 | 6/2010 |
| EP | 0150583 A2 | 8/1985 |

OTHER PUBLICATIONS

Search Report for corresponding application No. PCT/FR2012/051027 dated Aug. 6, 2012.

*Primary Examiner* — William Kelleher
*Assistant Examiner* — Bobby Rushing, Jr.
(74) *Attorney, Agent, or Firm* — Polster, Lieder, Woodruff & Lucchesi, L.C.

(57) ABSTRACT

The invention relates to a device which comprises a gear change fork (1), a hydraulic cylinder including a stationary cylindrical spindle (2) with a stationary transverse wall (3) projecting from said spindle (2) and a piston that is translatably movable by sliding over said transverse stationary wall (3). The piston consists of a piston body (4) closed by a radial closing part referred to as a "plug" (5) so as to define two inner chambers (6, 7) of the cylinder, which are situated on either side of said stationary transverse wall (3), respectively. Means for pressurizing both of the two cylinder chambers (6, 7) are provided for moving the movable piston (4, 5) in one direction or another. In the device according to the invention, the piston body (4) is directly built into the gear shift fork (1) whereby, as a result of the pressure in a cylinder chamber (6, 7), it is the fork (1) that moves translatably.

8 Claims, 2 Drawing Sheets

(51) Int. Cl.
*F16H 61/30* (2006.01)
*F16H 63/02* (2006.01)
*F16H 63/32* (2006.01)
*F16H 61/00* (2006.01)
*F16H 63/30* (2006.01)
*F16H 63/38* (2006.01)

(52) U.S. Cl.
CPC .............. *F16H 63/38* (2013.01); *F15B 15/00* (2013.01); *F15B 2215/30* (2013.01); *F16H 2063/3079* (2013.01); *F16H 2063/321* (2013.01); *Y10T 74/20024* (2015.01)

(56) References Cited

U.S. PATENT DOCUMENTS

| | | | |
|---|---|---|---|
| 6,763,920 B2 * | 7/2004 | Finley | F16F 9/49 188/287 |
| 7,311,035 B2 * | 12/2007 | Reynolds | E21B 41/0007 166/338 |

* cited by examiner

DEVICE FOR TRANSLATABLY CONTROLLING THE MOVEMENT OF A GEAR CHANGE FORK FOR A MOTOR VEHICLE GEARBOX

CROSS-REFERENCE TO RELATED APPLICATIONS

This application is the US National Stage under 35 U.S.C. §371 of International Application No. PCT/FR2012/051027 which was filed on May 9, 2012 and which claims priority to French Pat. App. No. 1154557 which was filed on May 25, 2011.

BACKGROUND

The present invention relates to a device for the controlled translational movement of a gear shift fork for an automobile gearbox.

The present invention particularly, but not exclusively, relates to a vehicle with a hydrostatic transmission.

Numerous automobile gearbox models are already known, in which gear shifting is assisted by cylinders which actuate the gear selecting and shifting forks.

As an example, French Pat. No. FR 2844570 describes a gear selecting and shifting device for an electronically controlled gearbox of an automobile, having several forks borne by a shaft with controlled translational movement relative to the gearbox housing and allowing the engagement of a chosen gear ratio associated with one of the forks by means of a synchronization sleeve translationally connected with the fork. The device has selection components associated respectively with the forks, each made up of a small single acting hydraulic cylinder that can be controlled selectively in order to radially move a locking finger of the selected fork in a groove of the shaft in such a way as to connect the selected fork with this shaft and to move the fork translationally for the shifting of a chosen gear ratio associated with this fork. The forks are mounted on a common shaft whose translational movement can be controlled by a double acting hydraulic cylinder.

BRIEF SUMMARY

The object of the present invention is to provide a device for controlled translational movement of a gear shift fork, which offers the possibility of taking into consideration a maximum number of constraints from the beginning of design of the gearbox integrating the fork, and to simplify or eliminate different problems of adjustment of geometry or of sealing.

Another object of the present invention is to provide such a device which simplifies the production of the gearbox housing while reinforcing its resistance and sealing.

Finally, another object of the present invention is to provide such a device which in a general manner is simple, stable, reliable and economical, particularly in its manufacture.

In order to achieve these objects, a device is provided for controlled translational movement of a gear shift fork, used particularly for an automobile gearbox. The device comprises a gear shift fork, a hydraulic cylinder which has a stationary cylindrical shaft with a stationary transverse wall projecting from the external surface of said shaft, and a piston which is translationally movable by sliding on said stationary transverse wall. The piston comprises a piston body closed by a radial closure part, called a "plug," in such a way as to define two internal chambers of the cylinder, which are located respectively on the two sides of said stationary transverse wall. The device further includes means for pressurization of fluid of both of the two chambers of the cylinder in order to move the piston in one direction or the other. In this device the piston body is directly integrated with the gear shift fork so that, under the effect of the pressure in a chamber of the cylinder, it is the fork that moves translationally.

The means for pressurization of fluid of both of the two chambers of the cylinder, in order to move the piston in one direction or the other, is comprised of two pressurized fluid intakes which are connected to a pressurized fluid source and which are located at both of the two ends of the stationary cylindrical shaft, each end communicating with a chamber of the cylinder respectively by an internal duct of the stationary cylindrical shaft.

According to the preferred embodiment of the device, the plug is attached axially on the piston body by screwing, a threaded axial bore of the plug cooperating by screwing with an axial threading of the external surface of the piston body.

Advantageously, a tightening socket is provided on the opposite lateral side of the plug with respect to the piston body so as to allow screwing of the plug onto the piston body.

An axial groove is also provided on the external surface of the piston body, there being a screw which engages this groove for translational guiding of the fork integrated with the piston body.

The external cylindrical surface of the plug has peripheral grooves with a cross-section. substantially in the shape of an arc of a circle, which form "ball indentation" tracks for positioning of the engaged gears or neutral position.

According to an alternative embodiment of the device, the piston is mounted so as to slide on the stationary cylindrical shaft in opposition to resilient return means which return the piston to the neutral position, so that the hydraulic cylinder of the device no longer functions in so-called "double acting mode" but rather in so-called "single acting mode with resilient return."

These resilient return means advantageously comprise two return springs, of the coaxial helical spring type with the stationary cylindrical shaft, which are applied on each of the two lateral sides of the piston.

An electronically controlled gearbox for an automobile is also disclosed, which has several gear selecting and shifting forks and has devices associated respectively with the forks, which control the translational movement of the associated fork, these devices being in accordance with the device described above in its broad outlines.

DESCRIPTION OF THE FIGURES

Other objects, advantages and features will become apparent from the following description of an illustrative embodiment, without limiting the subject matter and scope of the present patent application, accompanied by drawing in which.

DETAILED DESCRIPTION

Figure 1:
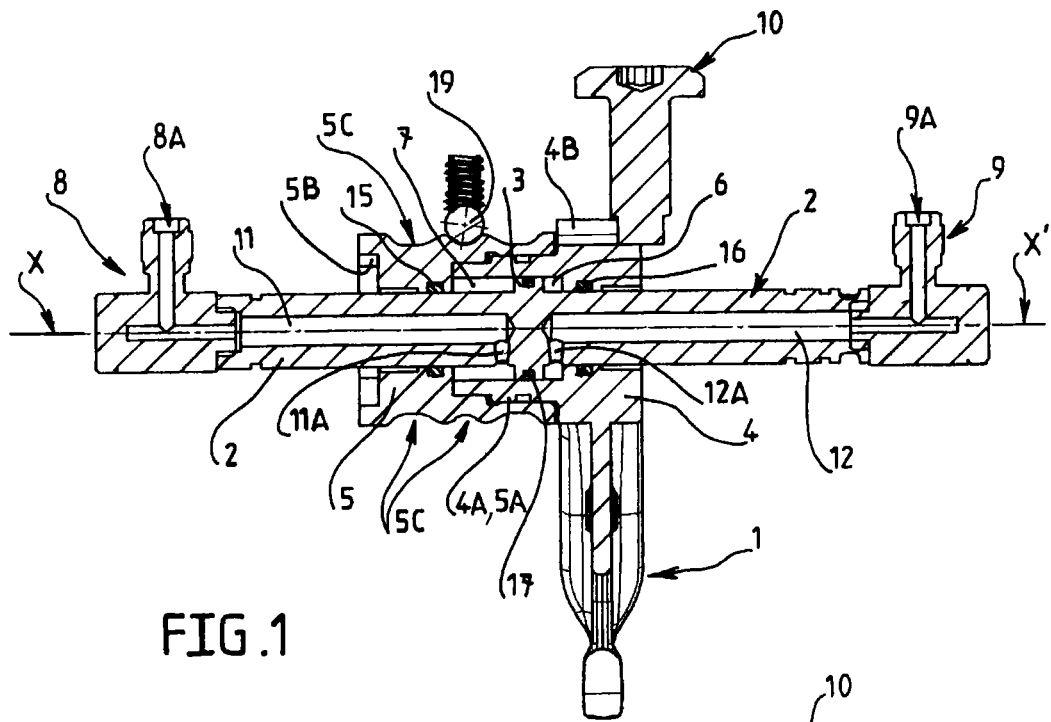
FIG. 1 is a view in longitudinal cross-section of the device which makes it possible to control the movement of a gear selecting and shifting fork.
Figure 2:
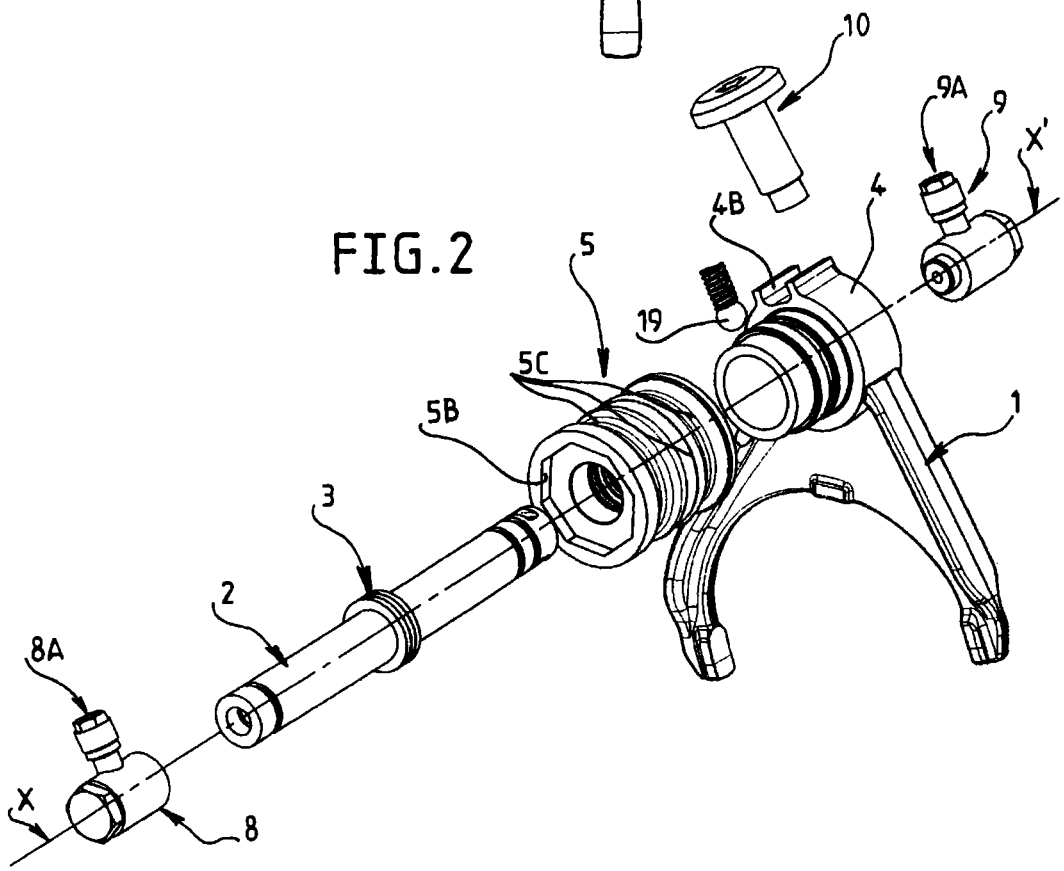
FIG. 2 is an exploded perspective view of the fork translation control device of FIG. 1.

FIGS. 1 and 2 show a first illustrative embodiment of a device which makes it possible to control the translational movement of a gear selecting and shifting fork 1 used, for example, in an electronically controlled or semi-automatic gearbox of an automobile.

This device is composed of a hydraulic cylinder type mechanism with which the fork 1 is integrated in the manner disclosed hereafter. The hydraulic cylinder includes a stationary cylindrical shaft 2, with axis XX', with a cylindrical transverse part 3 projecting from the external surface of the shaft 2, the part 3 being referred to as a "transverse wall" in the text, and a piston which is translationally movable by sliding on the cylindrical external surface of the transverse wall 3. The piston is formed by two parts attached to one another, namely a first part or piston body 4, which is closed laterally by a radial closure part or plug 5 in such a way as to define two internal chambers 6 and 7 of the cylinder, which are located respectively on the two sides of the transverse wall 3. Means for pressurizing fluid in each of the chambers 6 and 7 is provided in order to move the piston 4, 5 in one direction or the other. The piston body 4 is directly integrated with the gear shift fork 1 so that, under the effect of the pressure in a chamber of the cylinder, it is the fork 1 that moves translationally.

It is to be noted that the cylinder thus integrated with the fork is as close as possible to the synchronizer.

The means for pressurizing the two chambers 6 and 7 of the cylinder comprise two pressurized fluid intakes 8A and 9A which are connected to a pressurized fluid source and which are located on both ends of the stationary cylindrical shaft 2, each end communicating with a chamber 6, 7 of the cylinder respectively by an internal duct 12, 12A, 11, 11A, respectively of the stationary cylindrical shaft 2. These two internal ducts have an axial part 11, 12, respectively and an adjacent radial part 11A, 12A, respectively opening into the corresponding chamber.

The pressurized fluid intakes 8A and 9A are advantageously provided with end sleeves 8, 9, respectively which are attached, by screwing, for example, at the ends of the stationary cylindrical shaft 2.

The plug 5 and the piston body 4 with the integrated fork 1 are mounted facing one another on the cylindrical shaft 2; then the plug is screwed axially on the piston body 4. For this purpose, the plug 5 has a threaded axial bore 5A which is used to cooperate by screwing with an axial threading 4A of the external surface of the piston body 4.

A tightening socket 5B is provided on the opposite lateral side of the plug 5 with respect to the piston body 4, so as to allow the screwing of the plug 5 on the piston body 4.

An axial groove 4B is provided on the external surface of the piston body 4, which is used to receive a screw 10 for the translational guiding of the fork 1 integrated with the piston body 4.

Peripheral grooves 5C are provided on the external cylindrical surface of the plug 5. These grooves 5C, with a cross section substantially in the shape of an arc of a circle, form "ball indentation" tracks for positioning of the engaged gears or neutral position (illustrated by the position of the ball 19 in FIG. 1).

A seal 15 is provided for the connection between the plug 5 and the cylindrical shaft 2. Another seal 16 is provided for the connection between the piston body 4 and the cylindrical shaft 2. Finally, a seal 17 is also provided for the connection between the piston body 4 and the transverse wall 3.

The device for translational movement of a gear shift fork described above functions in the following manner.

The pressurized fluid (oil) arrives through the inside of the cylindrical shaft 2, namely through the duct 11, 11A or 12, 12A. Under the effect of the pressure, the piston 4, 5 moves, and the fork 1 integrated with the piston 4, 5 moves in order to engage a gear. The return to the neutral position takes place by the arrival of pressure from the other side of the transverse wall 3 that separates the two chambers 6 and 7 of the cylinder, that is to say through the duct 12 or 11 respectively, which returns the piston to neutral position, the ball indentation formed by the tracks 5C being provided in order to mark the positions of the engaged gears.

Figure 3:
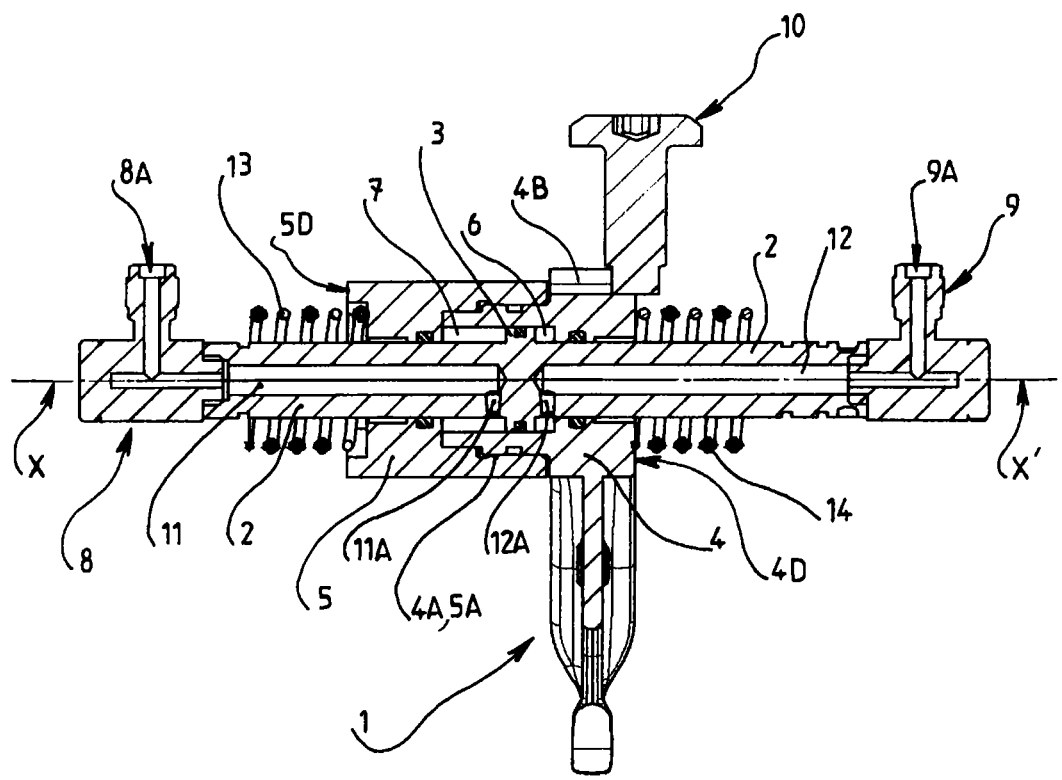
FIG. 3 is a view in longitudinal cross-section of an alternative embodiment of the fork translation control device of FIGS. 1 and 2.

An alternative embodiment of the device is shown in FIG. 3. In the embodiment of FIG. 3, the parts and portions of parts that are identical to the parts and portions of parts of FIGS. 1 and 2 are not described in detail and bear the same numerical references as the latter.

The differences between the embodiment of FIGS. 1 and 2 and the embodiment of FIG. 3 appear in the description of the functioning of this variant, which is the following.

The pressurized fluid (oil) arrives through the inside of the cylindrical shaft 2, namely through the duct 11, 11A or 12, 12A. Under the effect of the pressure, the piston 4, 5 moves, and the fork 1 integrated with the piston 4, 5 moves in order to engage a gear. At the same time, a spring 13, 14 located on the side of the duct in consideration is compressed, that is to say the spring 14 resting on the lateral surface 4D of the piston if the fluid arrives through the duct 12, 12A, or the spring 13 resting on the lateral surface 5D if the fluid arrives through the duct 11, 11A. In order not to continue to feed the cylinder with pressure, and consequently not to create additional losses by friction of the fork on the sleeve and not to have the feed pump function the whole time of the engaged gear, the pressure is slightly relaxed in order to get back to the operating play of the sleeve and of the fork. The spring in consideration relaxes and pushes the piston 4, 5 back. Then, the cylinder is hydraulically locked in the engaged gear position. For the return to the neutral position, it is the spring in consideration that pushes back the piston and the integrated fork.

It should be noted that, in this alternative embodiment, the external surface does not have peripheral grooves used to receive the "ball indentation" impression.

The device for controlled translational movement of a gear shift fork as described above in two different illustrative embodiments has numerous advantages, including the following advantages:

- it makes it possible to integrate the gear selecting and shifting function in a simpler and more "compact" manner,
- it uses the same oil as for the driving the vehicle, consequently, there is no oil diversity,
- the oil is of better viscosity than the gearbox oils, less sensitive to temperature,
- it makes possible an adjustment of the cylinder independently of the gearbox and clutch housings,
- it does not require any specific pressure control pump for controlling and actuating the gear shift cylinders,
- it makes it possible to eliminate the problems of adjustment based on the tolerance stacks between the gearbox actuator and the gear shift forks,
- it makes possible a good neutral position setting of the gears during the docking of the crossheads of the gearbox with the actuator of said gearbox,
- it allows good sealing between the actuator and the gearbox housing,
- it makes it possible to obtain a good mechanical resistance of the housing, because there is no longer any hole for the connection between the crossheads and the actuator of the gearbox, it makes it possible to simplify the production of the gearbox housing, because there are no channels or inserts for the oil chambers, and it eliminates the problems of porosity of the gearbox housing and of leaking under oil pressure.

Of course the present invention is not limited to the embodiments described and represented above as examples; other embodiments can be designed by the person skilled in the art without leaving the context and scope of the present invention.

The invention claimed is:

1. A device for controlled translational movement of a gear shift fork, used particularly for an automobile gearbox; the device comprising said gear shift fork, a hydraulic cylinder having a stationary cylindrical shaft with a stationary transverse wall projecting from an external surface of said shaft, a piston which is translationally movable by sliding on said stationary transverse wall said piston comprising a piston body closed by a plug in such a way as to define two internal chambers of the cylinder, which are located respectively on opposite sides of said stationary transverse wall; said device further including means for pressurizing fluid of both of the chambers of the cylinder in order to move the piston in one direction or the other; the piston body being directly integrated with the gear shift fork so that, under the effect of the pressure in one of the chambers of the cylinder, the fork moves translationally; said plug being attached axially to the piston body by screwing, said plug having a threaded axial bore which threadedly engages an axial thread on an external surface of the piston body; and a tightening socket provided on an opposite lateral side of the plug with respect to the piston body so as to allow the screwing of the plug on the piston body.

2. The device according to claim 1, wherein the means for pressurizing fluid of both of the chambers of the cylinder, in order to move the piston in one direction or the other, comprises two pressurized fluid intakes which are connected to a pressurized fluid source and which are located at opposite ends of the stationary cylindrical shaft, each end communicating with a chamber of the cylinder respectively by an internal duct of the stationary cylindrical shaft.

3. The device according to claim 1, wherein an axial groove is provided on the external surface of the piston body and a screw is engaged in the groove for translationally guiding of the fork integrated with the piston body.

4. The device according to claim 1, wherein the external cylindrical surface of the plug has peripheral grooves with a cross-section in the shape of an arc of a circle, which forms "ball indentation" tracks for positioning of the engaged gears or a neutral position.

5. The device according to claim 1, wherein the piston is mounted so as to slide on the stationary cylindrical shaft in opposition to a resilient return means which returns the piston to a neutral position, such that the hydraulic cylinder of the device functions in a so-called "single acting mode with resilient return."

6. The device according to claim 5, wherein said resilient return means comprises two return springs of the helical spring type coaxial with the stationary cylindrical shaft(2), which are applied on both of the two lateral sides of the piston.

7. An electronically controlled gearbox for an automobile, which has several gear selecting and shifting forks, wherein said gearbox comprises of a plurality of said devices of claim 1; there being one of said devices associated with each for to control the translational movement of the associated fork.

8. An automobile of the hydrostatic power train type comprising the electronically controlled gearbox of claim 7.

* * * * *